UNITED STATES PATENT OFFICE.

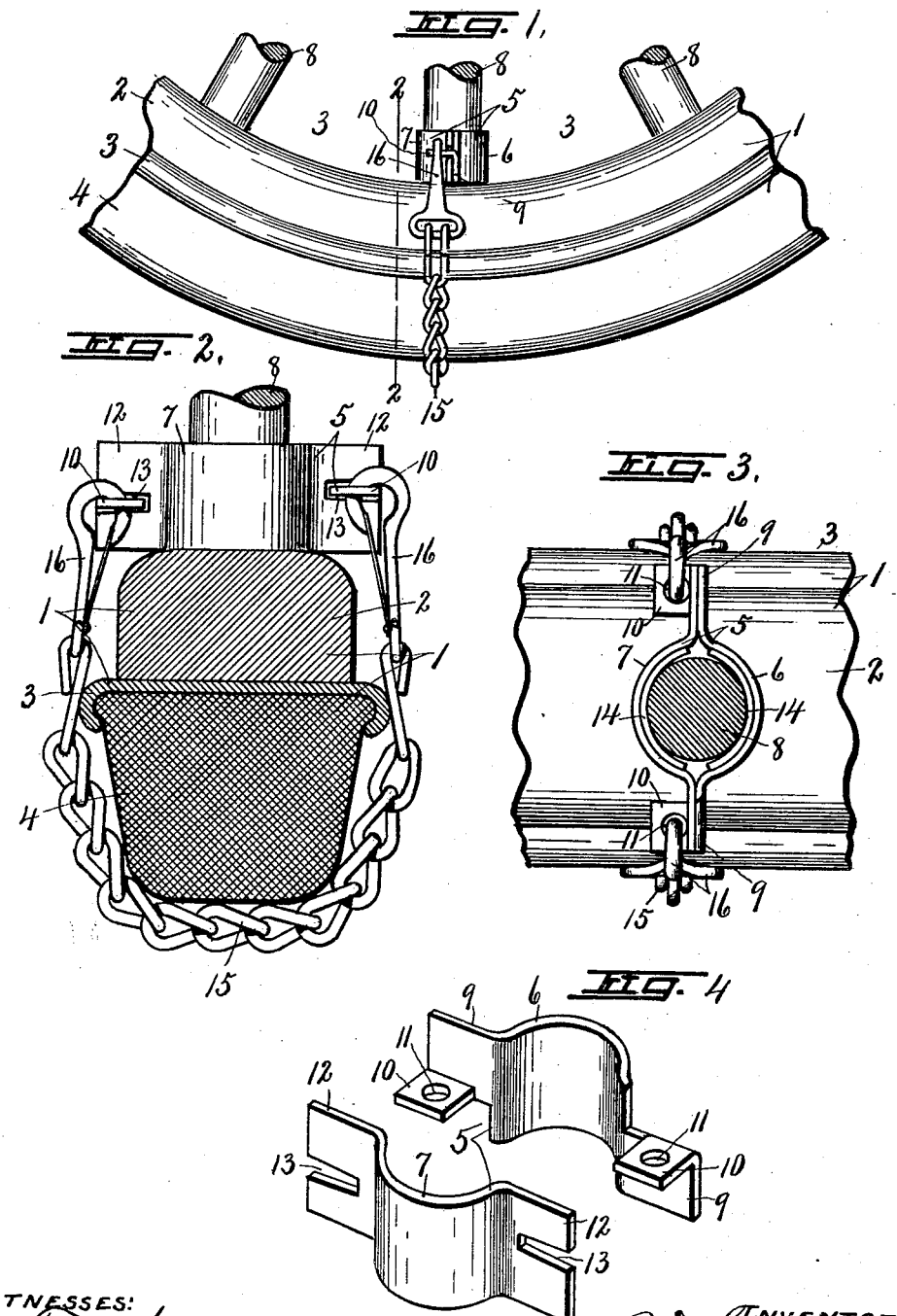

PATRICK D. SKAHEN, OF SYRACUSE, NEW YORK, ASSIGNOR, BY MESNE ASSIGNMENTS, TO HENRY H. SIMPSON, OF BROOKLYN, NEW YORK.

ANTISKIDDING ATTACHMENT.

1,275,484.     Specification of Letters Patent.     Patented Aug. 13, 1918.

Application filed April 9, 1917. Serial No. 160,679.

*To all whom it may concern:*

Be it known that I, PATRICK D. SKAHEN, a citizen of the United States of America, and a resident of Syracuse, in the county of Onondaga, in the State of New York, have invented new and useful Improvements in Antiskidding Attachments, of which the following, taken in connection with the accompanying drawings, is a full, clear, and exact description.

This invention relates to clamps intended primarily for use with anti-skidding chains or other devices of the spoke anchored type.

The main object is to provide means whereby either or both ends of the cross chains may be more expeditiously attached to and removed from the collar.

Another object is to expedite the assembling of the sections of the collar and cross chains thereon and to utilize the attaching elements of the cross chains for locking the collar sections together.

Other objects and uses relating to specific parts of the device will be brought out in the following description.

In the drawings—

Figure 1 is a side elevation of a portion of a vehicle wheel showing one of the anti-skidding devices as attached thereto.

Fig. 2 is an enlarged cross sectional view taken on line 2—2, Fig. 1.

Fig. 3 is an enlarged horizontal sectional view taken on line 3—3, Fig. 1.

Fig. 4 is a perspective view of the detached sections of the collar.

These anti-skidding devices are adapted to be attached at suitable intervals throughout the circumferential length of a vehicle wheel —1— having the usual felly —2—, rim —3— and solid tire —4—, said device comprising a collar —5— composed of sections —6— and —7—, the central portions of which are concavo-convex in plan to conform to the cross sectional contour of each of the spokes, as —8—, to which they are applied.

The collar section —6— is provided with radial arms —9— extending, respectively, from opposite ends thereof approximately half the axial length of the central portion so that the inner edge of one arm is disposed nearly in the plane of the outer edge of the other arm, both edges being provided with lateral offset lugs —10— having apertures —11— for receiving the attaching members of the cross chains presently described.

The other section —7— of the collar is also provided with opposite radially extending arms —12— of the same axial length as the central portion and are provided intermediate their ends with radial slots —13— for receiving the lugs —10— when the sections are clamped upon and around the outer ends of the spokes adjacent the inner face of the felly —2—, as shown more clearly in Figs. 1 and 2.

Both collars are provided with inner linings —14— of felt or other flexible material to protect the spoke against marring or undue abrasion.

When the collar sections —6— and —7— are assembled upon the spoke, the lugs —10— extend through and beyond the outer face of the arms —12— of the other section a sufficient distance so that the apertures —11— are also beyond the outer face of the arms —12—.

Each collar is adapted to receive and support a cross chain —15— extending transversely around and across the tread of the tire and having its opposite ends provided with snap hooks —16— for engagement in the apertures —11—, thereby holding the cross chain in operative position, and at the same time locking the two collar sections —6— and —7— together upon the spoke.

These cross chains are subjected to severe strains and wear and, therefore, require replacement by new ones when impaired, the snap hooks —16— affording a convenient and expeditious means for attaching, removing and replacing the chains when necessary.

It will be observed that the entire device comprises practically three parts,—viz; the collars —6— and —7— and the cross chain —15—,—and that these parts may be easily and quickly assembled upon or removed from the spokes by simply hooking or releasing the member —16— upon and from the lugs —10—.

The portions of the chain which extend across the tread of the tire are free to move back and forth a limited distance so as to avoid wearing the tire in one place, the connection of the hooks —16— in the apertured lugs —10— permitting this circumferential movement.

It is also evident that the strains upon the cross chains will be mainly radial and outwardly, thereby firmly holding the collars against the inner face of the felly and exerting a radial pull on said collars to avoid shearing strains upon the spokes.

What I claim is:

1. A clamp composed of sections having end flanges, the flanges of one section being provided with slots, while those of the other section are provided with apertured lugs adapted to project through said slots, and elements adapted to be passed through said apertured lugs for connection thereto and to lock said sections together on some intervening object.

2. A clamp comprising sections, one of which is provided with slots, the other being provided with laterally projecting lugs normally extending through said slots, and means adapted to engage said lugs when in normal position to lock said sections together and to connect a third element to said lugs.

3. A clamp comprising two sections, one of which is provided with slots, the other being provided with laterally projecting apertured lugs normally extending through said slots, and means adapted to pass through said apertured lugs to lock said sections together, and to connect an additional element to said lugs.

In witness whereof I have hereunto set my hand this 28th day of March, 1917.

PATRICK D. SKAHEN.

Witnesses:
E. A. THOMPSON,
M. VIOLA HOWLAND.

Copies of this patent may be obtained for five cents each, by addressing the "Commissioner of Patents, Washington, D. C."